W. F. DOERFLINGER.
PROCESS OF PRODUCING CARBON TETRACHLORID.
APPLICATION FILED MAY 19, 1909.
992,551.
Patented May 16, 1911.
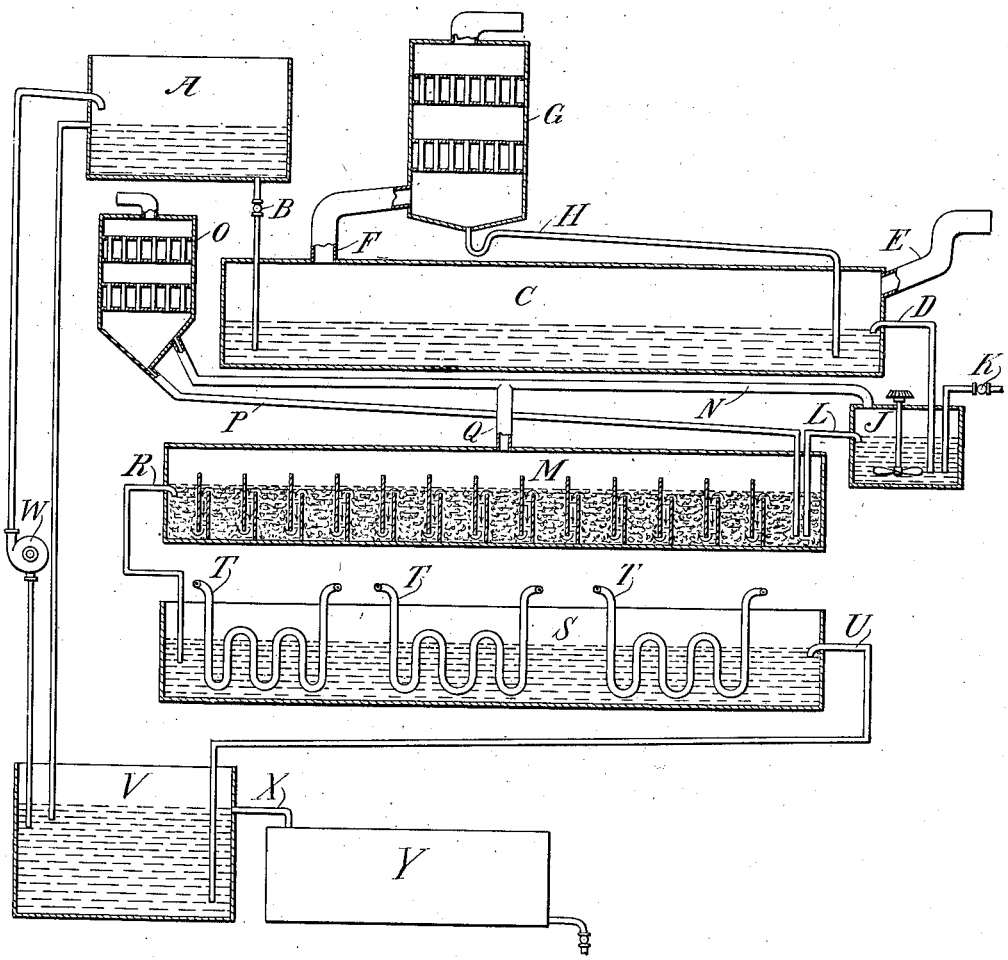
WITNESSES:
INVENTOR
William F. Doerflinger
BY Gifford & Bull
ATTORNEY

UNITED STATES PATENT OFFICE.

WILLIAM F. DOERFLINGER, OF NEW YORK, N. Y.

PROCESS OF PRODUCING CARBON TETRACHLORID.

992,551. Specification of Letters Patent. Patented May 16, 1911.

Application filed May 19, 1909. Serial No. 497,027.

*To all whom it may concern:*

Be it known that I, WILLIAM F. DOERFLINGER, a citizen of the United States, and a resident of New York city, borough of Brooklyn, in the county of Kings and State of New York, have invented certain new and useful Improvements in Processes of Producing Carbon Tetrachlorid, of which the following is a specification.

My invention relates to an improved method of producing carbon tetrachlorid from carbon disulfid and chlorin.

In conducting my process I employ a liquid absorbing agent, capable of taking up chlorin to form a chlorinating solution which can be made to react with carbon disulfid, converting it to carbon tetrachlorid and forming a liquid product capable of absorbing chlorin to form a chlorinating solution. This liquid medium I will refer to hereafter as the absorbing liquid. It may be of such nature that it merely dissolves chlorin to form a solution in which the chlorin absorbed is not chemically combined; or it may be of such nature that it dissolves chlorin combining with it to form a weak chemical compound which reacts with carbon disulfid directly or can be made to do so by suitable means as by the action of a catalytic agent. As specific absorbing liquids which may be employed I mention, by way of example, carbon tetrachlorid, or sulfur chlorid, or a mixture of carbon tetrachlorid and sulfur chlorid. Starting with such an absorbing liquid I subject it to the action of chlorin whereby a chlorinating agent is formed. I then admix carbon disulfid and cause it to react producing carbon tetrachlorid and forming a liquid absorbing agent. This is subjected to the action of chlorin forming a chlorinating solution, which is admixed with carbon disulfid and caused to react with it producing more carbon tetrachlorid and forming a liquid absorbing agent. The cycle is repeated as often as desired, absorbing more chlorin, admixing and converting more carbon disulfid and so on, producing more and more carbon tetrachlorid. From time to time a portion of the liquid may be withdrawn and the carbon tetrachlorid separated as by fractional distillation. Heat is evolved in the conversion of the carbon disulfid to carbon tetrachlorid and generally also, though in less amount in the absorption of chlorin to form chlorinating agent. This heat I abstract at some point or points in the cycle, and prefer to abstract it after the conversion of carbon disulfid to carbon tetrachlorid has taken place and before absorbing more chlorin. I prefer to so conduct the operation that at no point in the cycle does the temperature rise high enough to cause the liquid at that point to boil. This may be accomplished by suitable cooling and regulating the amount of chlorin and carbon disulfid introduced in each cycle. I prefer to induce combination by circulating the mixture of carbon disulfid and chlorinating agent in contact with an extended surface of a catalytic agent.

I prefer to start with a mixture of carbon tetrachlorid and disulfur dichlorid containing about equal molecular proportions of each, at about atmospheric temperature or below. This mixture is brought into contact with chlorin, whereby a solution of chlorin in carbon tetrachlorid and sulfur chlorid is formed. In general I apply the chlorin as a gas, either pure or as a constituent of a gaseous mixture; but I may also apply it as liquid chlorin. The mixture of carbon tetrachlorid and sulfur chlorid I employ in excess, and prefer to use it in such proportions that there is about 100 parts of the original mixture to each part of chlorin absorbed. It is, however, possible to operate successfully throughout wide limits. I next admix carbon disulfid generally in liquid form, and preferably in amount about chemically equivalent to the chlorin absorbed, *i. e.*, one molecule of carbon disulfid to six atoms of chlorin in solution or weak chemical combination (for each pound of chlorin absorbed about .35 lbs. of carbon disulfid.) Combination is induced by means of a catalytic agent for which purpose I prefer metallic iron, but any other suitable catalyzer may be used, such as ferric chlorid, antimony or antimony chlorid, or iodin. If a soluble catalyzer is employed it may be dissolved in the mixture of carbon tetrachlorid and sulfur chlorid at the start. While I prefer to use the carbon disulfid in amount chemically equivalent to the dissolved chlorin or chlorin weakly held chemically, it may be mixed in less or greater amount. If used in equivalent amount there results a mixture of carbon tetrachlorid and sulfur chlorid in increased amount. If in less amount the mixture will still contain dissolved chlorin or chlorin weakly held chemically, i. e., as monosulfur dichlorid. If in greater amount the resulting mixture may contain free sulfur or carbon-sulfur-chlorin compounds. Heat is evolved in the combination, which I prefer to abstract either at the point where the reaction occurs or at a subsequent stage. I then repeat the entire cycle of operations, absorb more chlorin, admix more carbon disulfid, induce combination, cool, and so on, as often as desired, producing carbon tetrachlorid and sulfur chlorid in ever increasing amount. As the amount increases a portion is withdrawn from time to time and the carbon tetrachlorid separated in a suitable manner, for instance, by fractional distillation. The residue consisting largely of sulfur chlorid may then be utilized in the manufacture of useful products, as in the manufacture of carbon tetrachlorid by known methods. I find that in general the carbon tetrachlorid produced from the residue by the old methods, contains considerable amounts of carbon disulfid and I prefer to introduce it back into my main process in proportion corresponding to its carbon disulfid content, whereby it is readily converted into carbon tetrachlorid free from carbon disulfid.

In practicing my invention I prefer to operate as follows, reference being had to the accompanying drawings in section, wherein suitable apparatus is represented in a conventional manner; it being understood that the apparatus may be greatly varied without departing from the spirit of my invention. From a reservoir A a mixture of disulfur dichlorid and carbon tetrachlorid containing about 53% carbon tetrachlorid and 47% sulfur chlorid, at about atmospheric temperature, is allowed to flow by way of a pipe into a chlorinator C, the rate of the flow being controlled by a cock B. In the chlorinator it flows slowly from one end to the other finally overflowing at the overflow pipe D. During its passage through the chlorinator it meets and absorbs a current of chlorin, entering at E, said chlorin flowing in the opposite direction toward the outlet F. The supply of chlorin and the rate of flow I so regulate that the mixture overflowing at D contains about one per cent. of chlorin dissolved or weakly held chemically. Any residual non-absorbable gas escapes at F, whence it passes to a condenser G, where entrained vapor of carbon tetrachlorid is condensed and runs back through the pipe H into the chlorinator C. The chlorin entering at E may be under pressure or suction. In general there is little heat evolved in the chlorin absorption, and the mixture leaves the chlorinator at only slightly increased temperatures. The chlorinator may also be constructed on the principle of the well known Lunge plate tower, or other absorbing tower or device. The chlorin solution overflowing at D passes into a mixer J, wherein carbon disulfid is admixed. The rate of carbon disulfid supply is controlled by a cock K. It is admitted in about the proportion of one molecule of carbon disulfid to six atoms of dissolved chlorin (i. e., for each 100 lbs. of mixture entering at D containing 1 lb. of absorbed chlorin, there is added about .36 lbs. of carbon disulfid). The addition of carbon disulfid is continuous and the rate of addition controlled by regulating the cock K. The mixture now containing admixed carbon disulfid overflows continuously from the mixer by way of the overflow pipe L into the converter M. Any vapor formed in the mixer J passes by a pipe N to a condenser O, where the vapors are condensed and flow back by the pipe P into the converter M. The converter M consists of a series of compartments loosely filled with pieces of iron, for instance, sheet metal clippings, and so arranged that the liquid enters at the bottom of each compartment and overflows at the top to the bottom of the next. During its passage the iron acts catalytically and the carbon disulfid is converted to carbon tetrachlorid and sulfur chlorid. Considerable heat is evolved in the converter; with the mixture entering at 15 degrees centigrade the temperature rises to around 40 degrees centigrade at the exit. Any vapor formed in M passes by way of the pipes Q and N to the condenser O where it is condensed and flows back into the converter M.

The liquid after passing through the various compartments of the converter M finally overflows through the pipe R to the cooler S where it is cooled by contact with the cooling coils T, through which cold water, brine, or cold carbon tetrachlorid or other cooling liquid is circulated. The temperature of the cooling liquid, rate of flow, and surface of the coils is so regulated that the mixture finally overflows by the overflow pipe U at about atmospheric temperature. From U the liquid flows into the receiver V, whence it is pumped by the pump W to the reservoir A to begin its round anew.

The reason for using the specific mixture of sulfur chlorid and carbon tetrachlorid is because it is a very efficient chlorin absorbing agent, which takes up chlorin with great avidity. The mixture also heats up only slightly in taking up chlorin, and has very little action upon structural material. The solution of chlorin in this medium reacts with carbon disulfid to form $CCl_4$ very readily in the presence of a suitable catalytic agent, with minimum formation of intermediate compounds. The solution also acts very slightly, if at all, upon carbon disulfid in the absence of a catalytic agent. This is a considerable advantage if carbon disulfid is occasionally fed a little too rapidly, since in this case there is little tendency to heat up unduly, in the absorbing compartments, where undue evolution of heat would be undesirable. Finally, it is not changed in composition by the reactions which are brought about in it since the $CCl_4$ and $S_2Cl_2$ are in the same relative amount in the mixture in which they are produced by the series of reactions, i. e., 1 $CCl_4$ to 1 $S_2Cl_2$, and it is only necessary to withdraw a portion to maintain the mixture constant in amount and composition. The mixture of a little $CS_2$ and the solution of Cl in $CCl_4$ and $S_2Cl_2$ also has a comparatively high boiling point.

As the amount of carbon tetrachlorid and sulfur chlorid accumulates, a portion overflows by the overflow pipe X into a stock tank Y. Carbon tetrachlorid of a very pure form is readily separated from the stock tank mixture. The sulfur chlorid after separation is marketed as such or otherwise utilized.

The process is conducted in a continuous manner and with very little labor, as it is practically automatic. It is easily controlled by watching the temperature in the converter M and in the chlorinator C. With a constant supply of chlorin, if the temperature tends to rise too high in the converter, the carbon disulfid supply is reduced or the rate of supply of liquid from the reservoir is increased by further opening the cock B. If the temperature in the converter drops it is in general not prejudicial since with the large excess of sulfur chlorid and large surface of iron exposed, conversion is induced (though at a slower rate) even at ordinary temperature. The temperature may, however, be raised either by decreasing the flow of liquid from the reservoir, or by increasing the supply of carbon disulfid. The appearance of the liquid at various points of the system and determination of the percentage of the various constituents assists in the intelligent control of the process.

The separation of very pure carbon tetrachlorid from the stock tank Y mixture is very easy. My preferred method is as follows: A portion of the stock tank mixture is heated and the carbon tetrachlorid fractionally distilled off and condensed. The vapors of carbon tetrachlorid may still contain a little sulfur chlorid, in practice about 1%. The condensate flows into an aqueous solution of caustic soda or other soluble caustic alkali, which is kept in continuous agitation. The caustic soda decomposes and combines with the sulfur chlorid. After the distillation is finished agitation is continued for a few hours to insure complete combination, then the liquid is allowed to settle into layers by gravity and the upper aqueous layer is siphoned off containing soluble sulfur compounds. I then give the carbon tetrachlorid a couple of water washes. If the sulfur and sulfur compounds are not all washed out, which is a tedious process on a large scale, on subsequent distillation reversion of carbon tetrachlorid to carbon disulfid is liable to occur. I therefore add a reagent which will prevent reversion to carbon disulfid on distilling in the presence of sulfur or sulfur compounds. Such a reagent is a strong solution of caustic soda or other soluble caustic alkali, or a solution of a soluble caustic alkali to which a compound of a metal forming insoluble sulfid with hydrogen sulfid, stable under the conditions, such as zinc sulfate has been added. I then distil off the carbon tetrachlorid and separate it from the water which passes over with it by gravity.

The equations illustrating the preferred method of operating as described in the specifications are as follows:

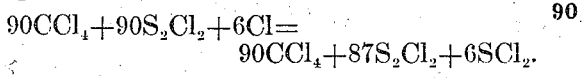
$$90CCl_4 + 90S_2Cl_2 + 6Cl = 90CCl_4 + 87S_2Cl_2 + 6SCl_2.$$

This is the reaction which occurs in the chlorinator. It is probable, however, that not all the chlorin unites to form $SCl_2$, a portion being merely physically dissolved.

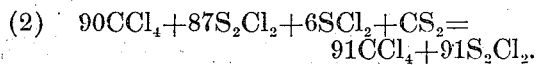
$$(2)\quad 90CCl_4 + 87S_2Cl_2 + 6SCl_2 + CS_2 = 91CCl_4 + 91S_2Cl_2.$$

This is the reaction which occurs in the converter. Of the $91CCl_4 + 91S_2Cl_2$ one $CCl_4$ and one $S_2Cl_2$ is withdrawn, the remaining $90CCl_4$ and $90S_2Cl_2$ going back to the chlorinator to begin another cycle.

The preferred temperature is atmospheric or a little lower at the entrance to the absorber, say 12° C. At the exit of the absorber slightly higher, say 15° C., in the converter between the entering temperature and the boiling point of the mixture, preferably leaving the converter at about 40° C. though it may be considerably higher.

It is preferred to so operate that the liquid leaving the chlorinator is red in color and yellow or reddish yellow, leaving the converter. The percentage composition leaving the chlorinator should show about one per cent. chlorin in excess of that necessary to combine with all the sulfur to form $S_2Cl_2$ and with all the carbon to form $CCl_4$; for example: $CCl_4$ 52.47%, $S_2Cl_2$ 46.53%, Cl 1.00%. Leaving the converter it is preferred that the mixture consist entirely of $CCl_4$ and $S_2Cl_2$, i. e. no $CS_2$, $CSCl_2$, $SCl_2$, or free chlorin, for example: $CCl_4$ 53.00, $S_2Cl_2$ 47.00.

Having now described my invention, what I claim and desire to protect by Letters Patent is:—

1. The process of producing carbon tetrachlorid, which consists in absorbing chlorin in a liquid medium comprising carbon tetrachlorid and chlorid of sulfur, admixing carbon disulfid in amount about equivalent to the chlorin absorbed, causing it to react with the chlorin absorbed to form carbon tetrachlorid by means of a catalytic agent, abstracting heat from the resulting product, and absorbing chlorin in it, admixing carbon disulfid in amount about equivalent to the chlorin absorbed and causing it to react with the chlorin absorbed forming carbon tetrachlorid by means of a catalytic agent.

2. In the production of carbon tetrachlorid the steps which consist in absorbing chlorin in a liquid medium comprising carbon tetrachlorid and disulfur dichlorid, admixing carbon disulfid and circulating the liquid mixture in contact with an extended surface of a catalytic agent at a temperature below 45° C.

3. The process of producing carbon tetrachlorid, which consists in absorbing chlorin in an excess of a liquid medium comprising sulfur chlorid and carbon tetrachlorid, admixing carbon disulfid and causing it to react with the chlorin absorbed by means of a catalytic agent forming carbon tetrachlorid.

4. The process of producing carbon tetrachlorid, which consists in absorbing chlorin in an excess of a liquid medium comprising sulfur chlorid and carbon tetrachlorid, admixing carbon disulfid and causing it to react with the chlorin absorbed at a temperature below the boiling point of the mixture by means of a catalytic agent forming carbon tetrachlorid.

5. The process of producing carbon tetrachlorid which consists in forming a chlorinating solution by subjecting a chlorin absorbing liquid to the action of chlorin, admixing carbon disulfid and causing it to react with the chlorinating solution, whereby carbon tetrachlorid is produced, and a liquid chlorin absorbing agent is formed, subjecting the product to the action of chlorin forming a chlorinating solution, admixing carbon disulfid and causing it to react with the chlorinating solution whereby carbon tetrachlorid is produced and a liquid chlorin absorbing agent is formed.

6. The process of producing carbon tetrachlorid, which consists in forming a chlorinating solution by subjecting a chlorin absorbing liquid to the action of chlorin, admixing carbon disulfid and causing it to react with the chlorin absorbed, whereby carbon tetrachlorid is produced, and a liquid chlorin absorbing agent is formed, abstracting the heat evolved by the reaction, and subjecting the product to the action of chlorin forming a chlorinating solution, admixing carbon disulfid and causing it to react with the chlorin absorbed whereby carbon tetrachlorid is produced and a liquid chlorin absorbing agent is formed.

7. The cyclic process of producing carbon tetrachlorid, which consists in absorbing chlorin in a mixture comprising carbon tetrachlorid and chlorid of sulfur, admixing carbon disulfid and causing its combination to form a solution containing an increased amount of carbon tetrachlorid, absorbing chlorin in this product, admixing carbon disulfid, and causing its combination to form solution containing an increased amount of carbon tetrachlorid.

8. The process of producing carbon tetrachlorid which consists in the alternate absorption of chlorin in an excess of liquid medium comprising carbon tetrachlorid and an excess of sulfur chlorid, and the admixture of carbon disulfid which is made to react with the chlorin absorbed to form carbon tetrachlorid.

9. The process of producing carbon tetrachlorid, which consists in the alternate absorption of chlorin in an excess of liquid medium comprising carbon tetrachlorid and an excess of sulfur chlorid, and the admixture of carbon disulfid which is made to react with the chlorin absorbed to form carbon tetrachlorid and abstracting the heat evolved by the reaction.

10. A process for producing carbon tetrachlorid, which consists in alternately absorbing chlorin in a liquid medium, comprising carbon tetrachlorid and sulfur chlorid and admixing carbon disulfid and causing it to react with the chlorin absorbed forming carbon tetrachlorid, and maintaining the temperature throughout below the boiling point of the mixture.

In testimony whereof I have signed my name to this specification in the presence of two subscribing witnesses.

WILLIAM F. DOERFLINGER.

Witnesses:
 FRANK E. RAFFMAN,
 C. G. HEYLMUR.